US011412713B2

United States Patent
Katsu et al.

(10) Patent No.: US 11,412,713 B2
(45) Date of Patent: Aug. 16, 2022

(54) INFORMATION PROCESSING DEVICE AND INFORMATION PROCESSING METHOD

(71) Applicant: SONY CORPORATION, Tokyo (JP)

(72) Inventors: Masanori Katsu, Tokyo (JP); Yoshiyuki Kobayashi, Tokyo (JP); Bunichi Nakamura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 799 days.

(21) Appl. No.: 16/081,671

(22) PCT Filed: Feb. 3, 2017

(86) PCT No.: PCT/JP2017/004052
§ 371 (c)(1),
(2) Date: Aug. 31, 2018

(87) PCT Pub. No.: WO2017/159109
PCT Pub. Date: Sep. 21, 2017

(65) Prior Publication Data
US 2021/0204520 A1     Jul. 8, 2021

(30) Foreign Application Priority Data
Mar. 15, 2016 (JP) .............................. JP2016-050484

(51) Int. Cl.
*A01K 29/00* (2006.01)
*G06K 9/62* (2022.01)
*A01K 11/00* (2006.01)

(52) U.S. Cl.
CPC .......... *A01K 29/005* (2013.01); *G06K 9/6232* (2013.01); *A01K 11/008* (2013.01)

(58) Field of Classification Search
CPC ......... A01K 29/005; G06N 20/00; G06K 9/62
See application file for complete search history.

(56) References Cited

U.S. PATENT DOCUMENTS 8,979,757 B2 * 3/2015 Mottram .............. A61D 17/002
                                                              600/301
9,871,692 B1 * 1/2018 Hutz .................... G08B 25/009
(Continued)

FOREIGN PATENT DOCUMENTS

CN       102036163 A     4/2011
EP          2832219 A1     2/2015
(Continued)

OTHER PUBLICATIONS

International Search Report and Written Opinion of PCT Application No. PCT/JP2017/004052, dated May 16, 2017, 06 pages of ISRWO.

(Continued)

*Primary Examiner* — Benyam Haile
(74) *Attorney, Agent, or Firm* — Chip Law Group

(57) ABSTRACT

An information processing device includes an acquisition unit that acquires a plurality of pieces of livestock-farming-related information related to livestock farming, a prediction unit that predicts a future value of an arbitrary parameter related to livestock farming on a basis of a prediction model generated on a basis of the livestock-farming-related information; and a prediction result presentation unit that presents a prediction result obtained by the prediction unit at a predetermined timing related to livestock farming. According to this configuration, it is possible to perform prediction in accordance with actual situations of livestock farms and the like and present users with the prediction result at optimum timings.

18 Claims, 11 Drawing Sheets

(56) References Cited

U.S. PATENT DOCUMENTS

| | | | |
|---|---|---|---|
| 2008/0147458 A1 | 6/2008 | Yamazaki et al. | |
| 2011/0081634 A1 | 4/2011 | Kurata et al. | |
| 2013/0304685 A1 | 11/2013 | Kurata et al. | |
| 2016/0345832 A1* | 12/2016 | Pavagada Nagaraja | ..................... G16H 40/67 |

FOREIGN PATENT DOCUMENTS

| | | |
|---|---|---|
| JP | 07-008128 A | 1/1995 |
| JP | 2008-148569 A | 7/2008 |
| JP | 5060978 B2 | 10/2012 |
| JP | 5440080 B2 | 3/2014 |
| JP | 5846292 B2 | 1/2016 |
| WO | 2013/145302 A1 | 10/2013 |

OTHER PUBLICATIONS

Extended European Search Report of EP Patent Application No. 17766117.0, dated Feb. 22, 2019, 08 pages.

* cited by examiner

FIG. 2

| SENSING UNIT | SENSED INFORMATION | DETAILS | SENSOR |
|---|---|---|---|
| LIVESTOCK-MOUNTED SENSOR | MOVEMENT HISTORY OF PIECE OF LIVESTOCK | COORDINATE INFORMATION | GPS, WiFi, Bluetooth (iBeacon), IMAGE |
| | DENSITY | NUMBER OF HEADS PER PERIPHERAL UNIT AREA | GPS, WiFi, Bluetooth (iBeacon), IMAGE |
| | EXERCISE BEHAVIOR TYPE | STOP, WALKING, RUNNING, ETC. | ABOVE + ACCELERATION, GYRO, GEOMAGNETIC |
| | EXCRETION | TYPE AND AMOUNT OF EXCRETION, INCLUDING BURP | MICROPHONE, IMAGE |
| | MEAL | TYPE, AMOUNT, NUMBER OF CHEWS | IMAGE, ACCELERATION (VIBRATION OF MOTIONS OF MOUTH) |
| | VITAL | PULSE, SWEATING, TEMPERATURE, WEIGHT, BLOOD PRESSURE, ETC. | VARIOUS VITAL SENSORS |
| | CRY | DETAILS OF CRY, VOLUME | MICROPHONE |
| ENVIRONMENT SENSOR | WEATHER | WEATHER, HUMIDITY, WIND SPEED | |
| | SOUND | MAGNITUDE AND TYPE OF NOISE | MICROPHONE |
| | HYGIENE | SMELL, DEGREE OF MESS, AMOUNT OF BACTERIA, ETC. | VARIOUS GAS SENSORS, IMAGE |
| | OTHERS | AMOUNT OF CO2, ILLUMINANCE, COLOR OF PERIPHERY, FLOWERS AND GREENERY, NUMBER OF (BENEFICIAL OR HARMFUL) INSECTS, ETC. | GAS SENSOR, ILLUMINANCE SENSOR, IMAGE SENSOR |
| | | POWER CONSUMPTION | WATT METER |
| FARMER-MOUNTED SENSOR (FARMING ROBOT IS ALSO POSSIBLE) | MOVEMENT HISTORY OF FARMER | COORDINATE INFORMATION | GPS, WiFi, Bluetooth (iBeacon), IMAGE |
| | CONTACT WITH PIECE OF LIVESTOCK | TALKING, BODY TOUCH, ETC. AND DETAILS THEREOF | MICROPHONE, IMAGE |
| | VITAL | PULSE, SWEATING, TEMPERATURE, WEIGHT, BLOOD PRESSURE, ETC. | VARIOUS VITAL SENSORS |

FIG. 5
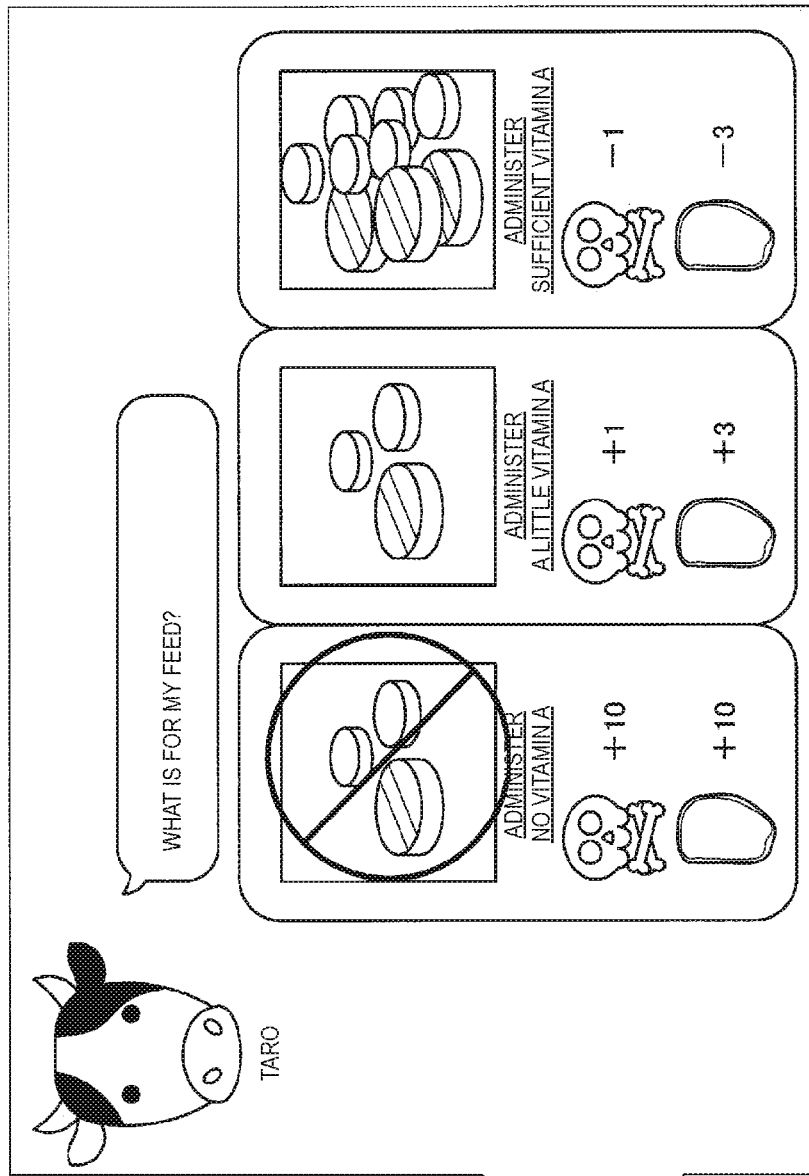
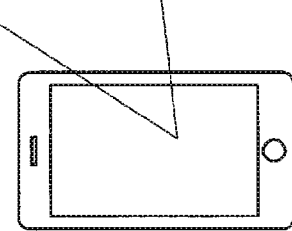
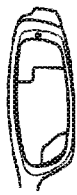

FIG. 10

| If | then |
|---|---|
| IF USER ARRIVES AT STABLE FIRST TIME IN MORNING | PREDICTION OF LIVESTOCK THAT IS LIKELY TO GET SICK IS EXECUTED |
| IF USER APPROACHES PIECE OF LIVESTOCK THAT HAS BEEN DETERMINED TO BE LIKELY TO GET SICK | PREDICTION OF REMEDY IS PERFORMED (COSTS AND IMPROVEMENT RATES OF RESPECTIVE REMEDIES ARE DISPLAYED) |
| IF USER APPROACHES PIECE OF LIVESTOCK AT TIME TO FEED | PREDICTION OF FEED AND MEAT QUALITY IS PERFORMED (RISKS AND EFFECTS OF RESPECTIVE FEEDS ARE DISPLAYED) |
| IF OCCURRENCE OF CONVULSION TO PIECE OF LIVESTOCK IS DETECTED | PREDICTION OF CAUSE IS PERFORMED |
| ... | ... |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/004052 filed on Feb. 3, 2017, which claims priority benefit of Japanese Patent Application No. JP 2016-050484 filed in the Japan Patent Office on Mar. 15, 2016. Each of the above-referenced applications is hereby incorporated herein by reference in its entirety.

TECHNICAL FIELD

The present disclosure relates to an information processing device, an information processing method, and a program.

BACKGROUND ART

In the related art, for example, Patent Literature 1 mentioned below describes a comprehensive breeding management support system assumed to perform consistent processing of data collection, analysis, prediction, feedback, and the like.

CITATION LIST

Patent Literature

Patent Literature 1: JP H7-008128A

DISCLOSURE OF INVENTION

Technical Problem

Growth of livestock and poultry in the livestock farming industry is intricately involved with various factors including not only nutritional factors such as protein and an energy level contained in ingested feeds but also sex differences, genetic factors of animals themselves, environmental factors such as temperatures, humidity, and wind speeds, stable structures for breeding, breeding densities, presence or absence of disease, and the like.

Predicting a growth reaction of livestock by varying the above-described factors is important for livestock farming management in order to gain maximum profits at a minimum cast. Thus, research on growth prediction for livestock farming has been progressing in various places.

However, even if a prediction result is accurate, it is necessary to promptly reflect the prediction result on breeding of livestock and poultry in accordance with a current situation.

Therefore, it is desired to perform prediction in accordance with actual situations of livestock farms and the like and present users with the prediction result at optimum timings.

Solution to Problem

According to the present disclosure, there is provided an information processing device including: an acquisition unit configured to acquire a plurality of pieces of livestock-farming-related information related to livestock farming; a prediction unit configured to predict a future value of an arbitrary parameter related to livestock farming on a basis of a prediction model generated on a basis of the livestock-farming-related information; and a prediction result presentation unit configured to present a prediction result obtained by the prediction unit at a predetermined timing related to livestock farming.

In addition, according to the present disclosure, there is provided an information processing method including: acquiring a plurality of pieces of livestock-farming-related information related to livestock farming; predicting a future value of an arbitrary parameter related to livestock farming on a basis of a prediction model generated on a basis of the livestock-farming-related information; and presenting a result of the prediction at a predetermined timing related to livestock farming.

In addition, according to the present disclosure, there is provided a program causing a computer to function as: a means for acquiring a plurality of pieces of livestock-farming-related information related to livestock farming; a means for predicting a future value of an arbitrary parameter related to livestock farming on a basis of a prediction model generated on a basis of the livestock-farming-related information; and a means for presenting a result of the prediction at a predetermined timing related to livestock farming.

Advantageous Effects of Invention

According to the present disclosure described above, it is possible to perform prediction in accordance with actual situations of livestock farms and the like and present users with the prediction result at optimum timings. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is a schematic diagram illustrating types of sensing units, sensing information detected by various sensors, details of sensing information, and sensors used in sensing.

FIG. 5 is a schematic diagram illustrating another presentation example of prediction results by the prediction result presentation unit.

FIG. 10 is a schematic diagram illustrating an example in which, in a case in which a certain event occurs (an "if" clause), prediction is performed (a "then" clause).

MODE(S) FOR CARRYING OUT THE INVENTION

Figure 1:
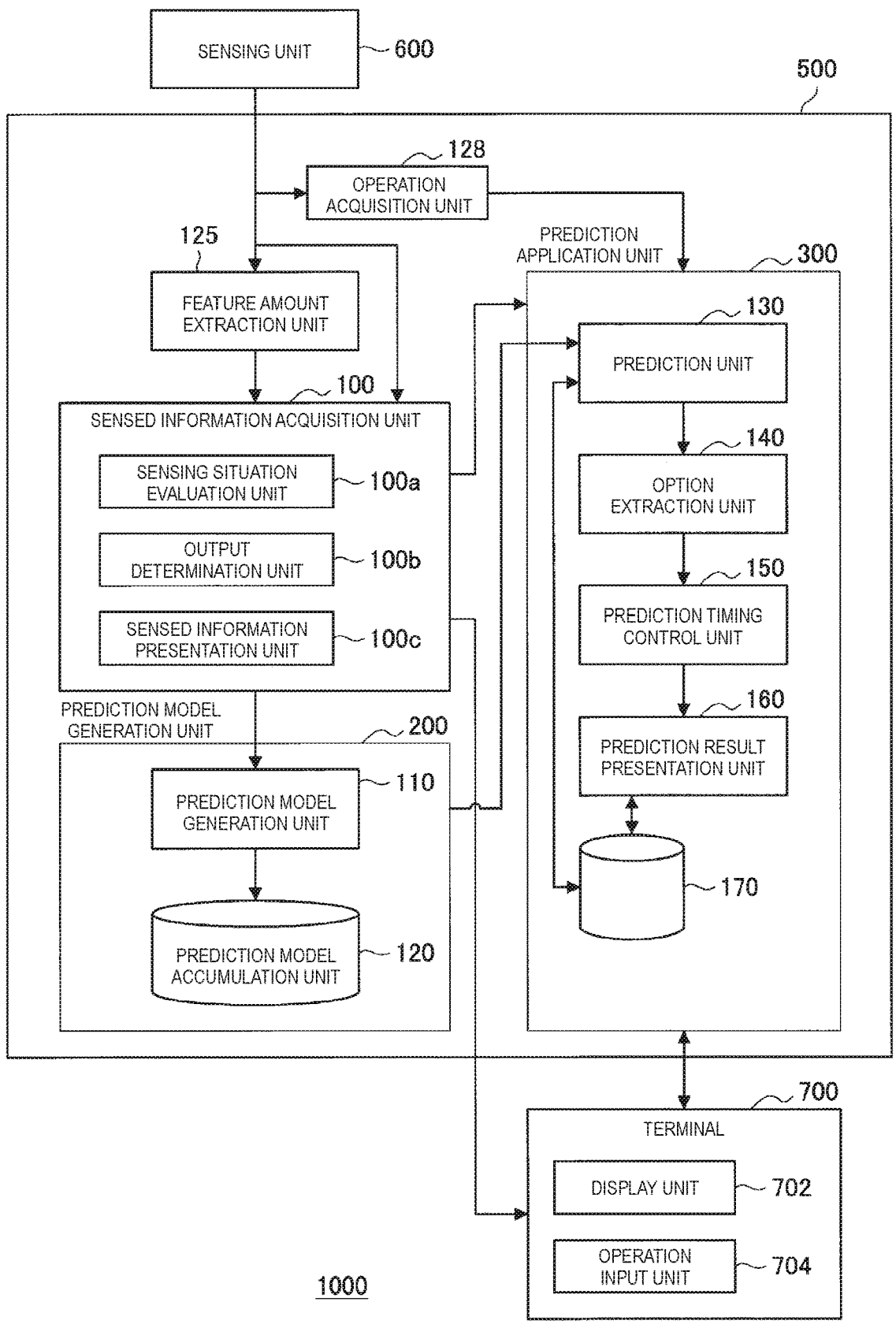
FIG. 1 is a schematic diagram illustrating a configuration of an information processing system according to an embodiment of the present disclosure.

Hereinafter, (a) preferred embodiment (s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Example of configuration of information processing system
2. Regarding evaluation of sensing situation
3. Regarding prediction and presentation of prediction result
1. Example of Configuration of Information Processing System The present embodiment provides a system including a sensing system in which livestock farmers can readily measure conditions of pieces of livestock, a prediction model generation device based on a large scale of data, a mechanism which presents necessary predictions that can be easily understood when necessary, and a mechanism in which livestock farmers can add newly measured data. Thus, in the present embodiment, prediction results resulting from selectable options for behaviors performed with respect to livestock will be displayed for each of the options, and risks and effects will be introduced as the prediction results. In addition, prediction result display timings will be determined in the context of livestock and livestock farming users. Sensing units for measuring data in sufficient amounts with sufficient reliability will be studied.

First, a configuration of an information processing system 1000 according to an embodiment of the present disclosure will be described with reference to FIG. 1. As illustrated in FIG. 1, the information processing system 1000 according to the present embodiment includes an information processing device (server) 500, a sensing unit 600, and a terminal 700 of a user (livestock farmer). The information processing device 500 and the sensing unit 600, and the information processing device 500 and the terminal 700 are connected in a wired or wireless manner to transmit and receive information. A connection method thereof is not particularly limited.

The terminal 700 is configured as an electronic apparatus, for example, a mobile terminal such as a smartphone, a wearable terminal, a tablet terminal, eyeglasses that can present information, or a personal computer (PC). The terminal 700 has a display unit 702 configured with a liquid crystal display or the like and an operation input unit 704 such as a touch sensor with which operations of a user are input.

The information processing device 500 may be a server configured in, for example, a cloud computing system. In addition, communication between the information processing device 500 and the sensing unit 600 may be periodic uploading or uploading in accordance with an acquisition request. The sensing unit 600 may upload a measured raw signal or may analyze part thereof and transmit the result to the information processing device 500. The sensing unit 600 may have a communication unit and transmit sensed data to the information processing device 500. In addition, a plurality of sensor results may be transmitted to the information processing device 500 from a communication unit of a terminal such as a smartphone having a plurality of sensors.

As illustrated in FIG. 1, the information processing device 500 has a sensed information acquisition unit 100, a prediction model generation unit 200, and a prediction application unit 300. The prediction model generation unit 200 includes a prediction model generation unit 110 and a prediction model accumulation unit (database) 120. In addition, the prediction application unit 300 has a prediction unit 130, an option extraction unit 140, a prediction timing control unit 150, and a prediction result presentation unit 160. The prediction model generation unit 200 and the prediction application unit 300 configure a predictor. Note that each of the constituent elements illustrated in FIG. 1 is configured as a circuit (hardware), or a central processing unit such as a CPU, and a program (software) for causing them to function.

The sensed information acquisition unit 100 and the predictor are assumed to be asynchronous. As will be described below, a configuration in which a context is recognized on the basis of partial sensor data and all sensor information necessary for the predictor is requested is conceivable.

The sensed information acquisition unit 100 acquires a sensor signal when a sensor (the sensing unit 600) mounted on a piece of livestock, mounted in a livestock environment, mounted on a farmer, or the like senses chronological data. The sensing unit 600 is constituted by various sensors.

FIG. 2 is a schematic diagram illustrating types of the sensing unit 600, sensed information detected by the various sensors, details of the sensed information, and sensors to be used in sensing. As illustrated in FIG. 2, the types of the sensing unit 600 include a livestock-mounted sensor mounted on a piece of livestock, an environment sensor that acquires environment information of a facility or the like for breeding livestock, and a farmer-mounted sensor that is mounted in a livestock breeder, a robot, or the like in a farm. As illustrated in FIG. 2, as data to be sensed, data to be sensed from livestock, data to be sensed from an environment such as a barn, and data to be sensed from a person such as a breeder are exemplified. As techniques of the sensing unit 600 to acquire sensed information, although acquisition through wired communication, acquisition through wireless communication, and the like are exemplified in addition to direct acquisition of information, the techniques are not limited thereto.

In a case in which cows in barn are to be detected, for example, cameras for imaging images of the cows are provided as the sensing unit 600. The sensing unit 600 may include a portion that efficiently acquires sensor values by controlling the cameras and livestock in accordance with the system. For example, fixed cameras may be mounted at positions of the heads of livestock taken when the livestock are fed. In addition, delicious food may be sprinkled to the position of the cameras to entice the livestock. In addition, a moving camera may move on a rail or the like to image peripheries of the eyes of the livestock in a stable. In addition, with introduction of livestock face recognition, images of the livestock may be captured through automatic and remote control using a system in which a drone reaches peripheries of the faces of the livestock.

2. Regarding Evaluation of Sensing Situation

Figure 3:
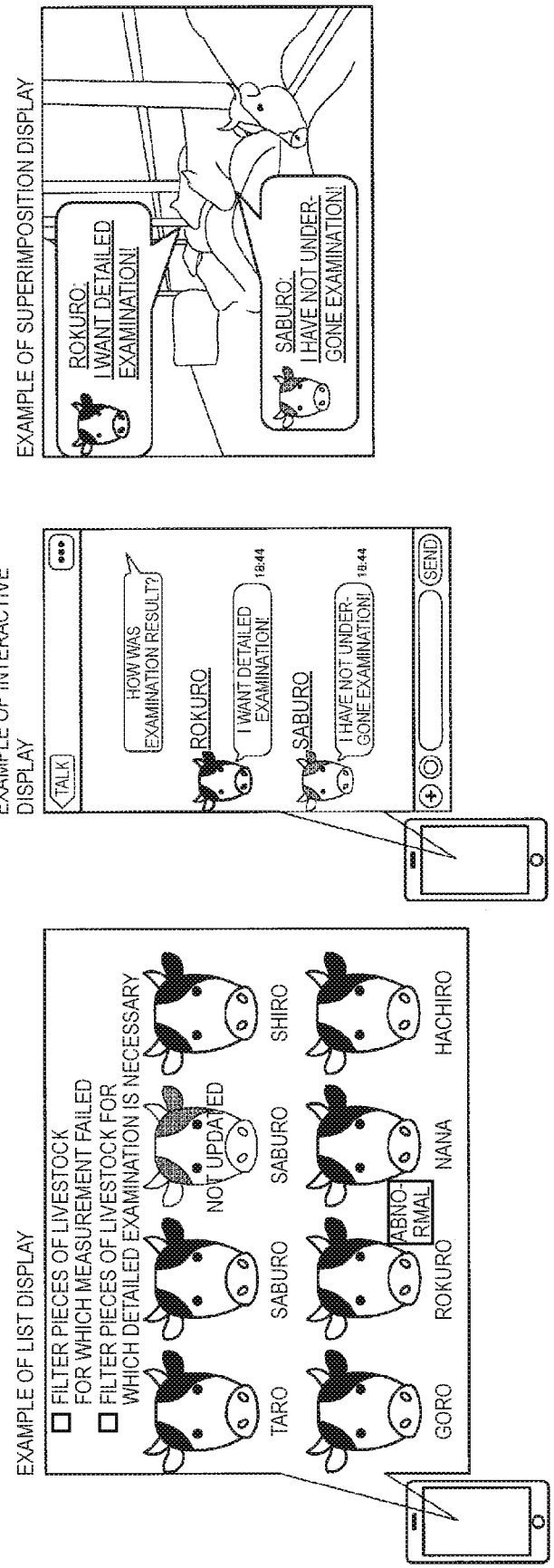
FIG. 3 is a schematic diagram for describing evaluation of a sensing situation and re-measurement in a case in which a sensing unit senses cows in a barn.

FIG. 3 is a schematic diagram for describing evaluation of a sensing situation and re-measurement in a case in which the sensing unit 600 senses cows in a barn. The sensing unit 600 or the sensed information acquisition unit 100 can include a constituent element that determines insufficient sensing results by itself. Accordingly, a sensing situation with respect to a sensing result can be evaluated and determined and then presented to a user. FIG. 1 illustrates a configuration of the sensed information acquisition unit 100 evaluating and determining sensing situations.

As illustrated in FIG. 1, the sensed information acquisition unit 100 has a sensing situation evaluation unit 100a, an output determination unit 100b, and a sensed information presentation unit 100c. The sensing situation evaluation unit 100a evaluates a sensing situation. As evaluation indexes, for example, shake, blur, and the like appearing in a captured image of a camera are used. The sensing situation evaluation unit 100a, for example, evaluates shake or blur from data of a captured image on the basis of a contrast value of the image, and if there is a certain level of shake or blur or higher, sensing results are set to be unavailable. In addition, information of a deviation from a past history of livestock (e.g., a sudden rise in a blood glucose level 3 times higher than an average value of the past three months) may be used, or information regarding a deviation from a livestock group that has been inspected in the same period (e.g., a blood glucose value of a specific kind of livestock that is three times higher than an average blood glucose value of 100 heads of livestock other than the aforementioned livestock) may be used.

The output determination unit 100b determines whether output of an evaluation result is possible, and if output is possible, the sensing situation presentation unit 100c presents the evaluation result to the terminal 700 of the user. In the example of list display illustrated in FIG. 3, a list of pieces of livestock for which measurement has failed, pieces of livestock which need precise observation, and pieces of normal livestock is illustrated. The example of the list display illustrated in FIG. 3 shows that, among 8 cows, the sensing result of "Rokuro" indicates "abnormal," and the sensing result of "Saburo" indicates "not updated." The output determination unit 100b may perform discrete display and determination ("measurement failure" and "detailed examination is necessary or the like"), and express a level of stability of a sensing situation with a continuous value using a color scale.

In the example of interactive display illustrated in FIG. 3, the sensing result of "Rokuro" indicating "abnormal" and the sensing result of "Saburo" indicating "not updated" are illustrated in interactive-formatted timeline display. In addition, in the example of superimposition display illustrated in FIG. 3, interactive-formatted timeline display and images of cows acquired from eyeglasses that a user is wearing are displayed in a superimposed manner. In each display, the livestock may be expressed as if the livestock were speaking in combination with sound. In addition, a timing at which the livestock moo may be detected to output display and sound at that timing. As described above, when sensed information is acquired, the user can realistically recognize a sensing result with the evaluated sensed information and the presented evaluation result.

The sensing unit 600 can acquire information that can be measured from livestock such as acceleration, heights, weights, amounts of exercise, excretion amounts, static information such as sex and ancestries, and images measured with external cameras. In addition, the sensing unit 600 can acquire information that can be measured from surrounding environments such as temperatures, weather, barn densities, and feed distribution ratios. In addition, the sensing unit 600 can acquire information of final outputs (information desired to be predicted) such as meat grades, consumer reputation, weights, and death times. In addition, the sensing unit 600 can acquire transitions of time-series information by using a database.

In addition, sensor values used by the information processing device 500 may be outputs of sensors acquired by the sensing unit 600 as they are, or results of features extracted by a feature amount extraction unit 125 from outputs of the sensors may be used. In a case in which sensor outputs are used without change, data such as image data obtained through capturing of the camera, sound data acquired by a microphone, acceleration, position information (GPS), vital data, and temperatures can be used. Information extracted by the feature amount extraction unit 125 includes, for example, information including muddiness of eyes extracted from image data of faces of cows, positions of eyes, and the like.

The prediction model generation unit 110 generates a prediction model on the basis of the information acquired by the sensed information acquisition unit 100. The information acquired by the sensed information acquisition unit 100 is accumulated in a database to generate a prediction model from the accumulated information. The prediction model generation unit 110 learns the information acquired by the sensed information acquisition unit 100 through, for example, linear regression, an SVN, a neural network, or the like to generate a prediction model. The prediction model accumulation unit 120 is a database in which prediction models are accumulated.

3. Regarding Prediction and Presentation of Prediction Result

Next, the prediction application unit 300 will be described. The prediction application unit 300 presents users with necessary prediction when it is necessary. In addition, final decisions are set to be made by livestock farmers on the basis of predicted results.

The prediction unit 130 performs prediction on the basis of prediction models. As an example, prediction by the prediction unit 130 is performed when it is determined that prediction is necessary. As described above, acquisition of sensed information by the sensed information acquisition unit 100 is asynchronous with prediction presentation timings. For example, when a user selects an amount and type of feed, the system may also use information including a degree of exercise of cows and the like. To determine degrees of exercise and the like, for example, it is desirable to cause a motion sensor or the like to operate at all times, and even in that case, acquisition of sensed information by the sensed information acquisition unit 100 is set to be asynchronous with prediction presentation timings.

The option extraction unit 140 extracts options that are prediction targets to be presented to a user. The option extraction unit 140 extracts, for example, a plurality of types of feed as a plurality of options as will be described below with reference to FIGS. 4A, 4B, and 4C. The prediction unit 130 performs prediction on each of the options extracted by the option extraction unit 140.

The prediction timing control unit 150 controls presentation timings of prediction results. The prediction timing control unit 150 can use contexts of livestock or users (livestock farmers) as presentation timings of prediction.

The prediction timing control unit 150, in principle, presents a user with a prediction result at a timing at which the user performs any action. Thus, on the basis of a sensed result from the sensing unit 600, a behavior acquisition unit 128 acquires behavior of the user and performs presentation of a prediction result on the basis of the acquired behavior. For example, the behavior acquisition unit 128 detects a timing at which the user feeds livestock and presents the user with information regarding the feed such as the type and effects of the feed at that timing. Since livestock GPS information is obtained from livestock-mounted sensors that are mounted in the livestock and user GPS information is obtained from a farmer-mounted sensor mounted on the user (livestock farmer) as illustrated in FIG. 2, the behavior acquisition unit 128 can acquire timings at which the user should feed the livestock by comparing the information. In addition, prediction results may be presented in accordance with contexts of the user. In a case in which there is something to be prepared, for example, prediction results may be presented "when the user starts moving toward a barn" or "when the user approaches a barn." In addition, a presentation timing may be set by directly detecting a motion of the user using a camera or a motion sensor, or a predetermined schedule (information that the user goes to the barn at 7 in the morning or the like) may be used. In addition, a presentation device may be changed in accordance with a presentation timing, or an option extraction condition may be changed. In addition, a presentation expression may be changed in accordance with a presentation device. Furthermore, the information processing device 500 may actively generate a presentation timing. In addition, in a case in which an event related to the life of livestock is detected or the like, notification may be conditionally provided directly to a terminal of a veterinarian. In addition, an existing communication means may be used. A sense of intimacy can also be improved by using a metaphor of "a message from a cow," for example. Accordingly, the user can easily acquire the information, unlike a method for users starting a dedicated device to get information.

The prediction result presentation unit 160 performs a process for presenting prediction results. The prediction result presentation unit 160 performs a process for presenting prediction results resulting from selectable options for behaviors performed with respect to livestock, for example, for each of the options. As a prediction result, risks and effects are presented. At this time, the number of optimal solutions may not be one. A presentation method can be customized by learning a preference of the user from information representing what the user finally selected (a past history). There is a technique of, for example, changing candidates of information to be presented, changing the order of presentation, and causing display of information that is selected at all times to stand out on the basis of a past history. Information presented by the prediction result presentation unit 160 is transmitted to the terminal 700 of the user and displayed on the display unit 702 of the terminal 700 of the user 700.

As will be described with reference to FIG. 5 and the like, in presentation of information by the prediction result presentation unit 160, a prediction value in a case in which a variable controllable by the user is changed can be displayed. Displaying effects and probabilities easily understandable can help the user easily make a determination. Since ex post presentation of information is meaningless, information may be presented to the terminal 700 of the user in real time. Information may be presented to a device (feed distributor) to cause the device to automatically adjust assigned feed distribution.

Figure 9:
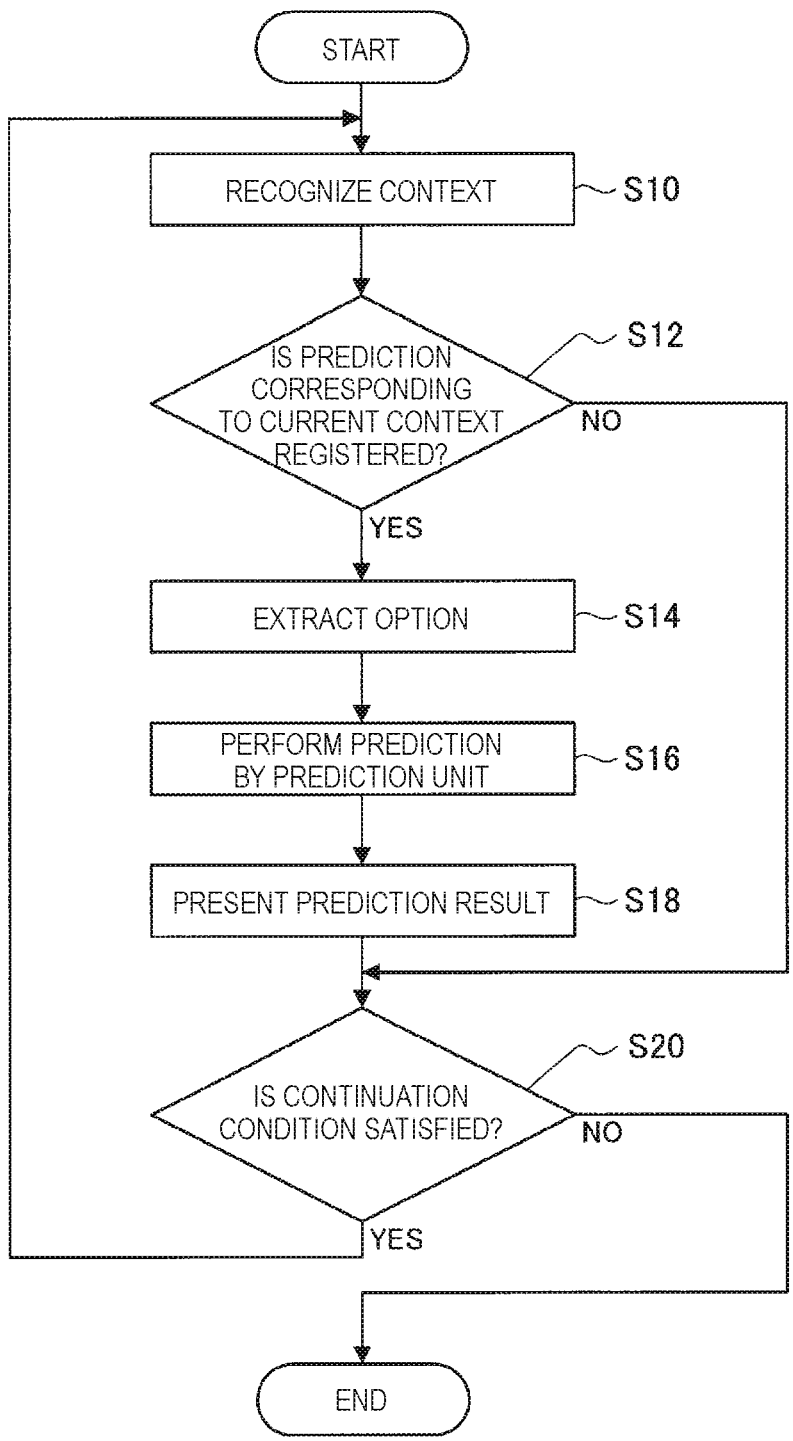
FIG. 9 is a flowchart illustrating a process of a prediction timing control unit.

FIG. 9 is a flowchart illustrating a process of the prediction timing control unit 150. First, a context is recognized in Step S10. Context recognition includes recognition of a time, a position and behavior of the user, an abnormal behavior of a cow, a cumulative value, and the like. Context recognition can be performed by, for example, a motion sensor or the like, and as an example, the technique described in JP 2006-345269A or the like can be used. As described above, sensing operates asynchronously with the predictor and can be easily realized by performing acquisition of results (pull-type or push-type).

In the next Step S12, it is determined whether a prediction corresponding to a current context has been registered. Then, in the case in which a prediction corresponding to the current context has been registered, the process proceeds to Step S14. In Step S14, extraction of options is performed by the option extraction unit 140, and in the next Step S16, prediction with regard to each of the extracted options is performed by the prediction unit 130. In the next Step S18, presentation of a prediction result is performed by the prediction result presentation unit 160.

In the next Step S20, it is determined whether a process continuation condition is satisfied, and in a case in which the continuation condition is satisfied, the process returns to Step S10. On the other hand, in a case in which the continuation condition is not satisfied, the process ends.

Note that the process of FIG. 9 can be applied also to a system in which "a prediction is replied only when a user inquires." In a case in which an inquiry by a user is detected through voice recognition or the like, or in a case in which whether a user inquires is recognized through a button operation or the like, prediction is started. At this time, the inquired content is recognized as a context, and in a case in which the continuation condition is not satisfied, the process ends.

In a case in which a certain event occurs (an "If" clause), the prediction application unit 300 executes prediction (a "then" clause) as illustrated in FIG. 10. In Step S12 of FIG. 9, in a case in which a certain event occurs, if the event is registered as in (the "If" clauses) of FIG. 10, prediction is executed (the "then" clauses). Conditional statements can be registered by the user (in creation of a recipe, for example, a fixed phrase "a prediction that XX if XX is replied" is used). The conditional statements are shared by users, and introduction of a new function and the like are also possible. Although a ratio of "If" clauses to "then" clauses is set to 1 to 1 for the sake of simplification in FIG. 10, the ratio may be 1 to many. In that case, all prediction results may be displayed at once, or prediction results may be displayed in accordance with a setting of a user or in a preset order.

In addition, a list of prediction candidates may be displayed first, and the user may select a prediction from the terminal 700. In that case, when the same condition is applied from the second time, a prediction option selected by the user the previous time may be displayed. The prediction result presentation unit 160 holds information regarding a preference for selection of the user on the basis of a history of predictions selected by the user when similar prediction results are presented in the past, and when a similar prediction result is presented the next time, an option that is presumed to be selected by the user is presumed, and emphasis display is performed on the option by setting the option as default, displaying the option on an initial screen, displaying the option with a cursor placed thereon, or the like. In addition, options may each be displayed in order from those having greater differences or may be displayed at random.

Figure 11:
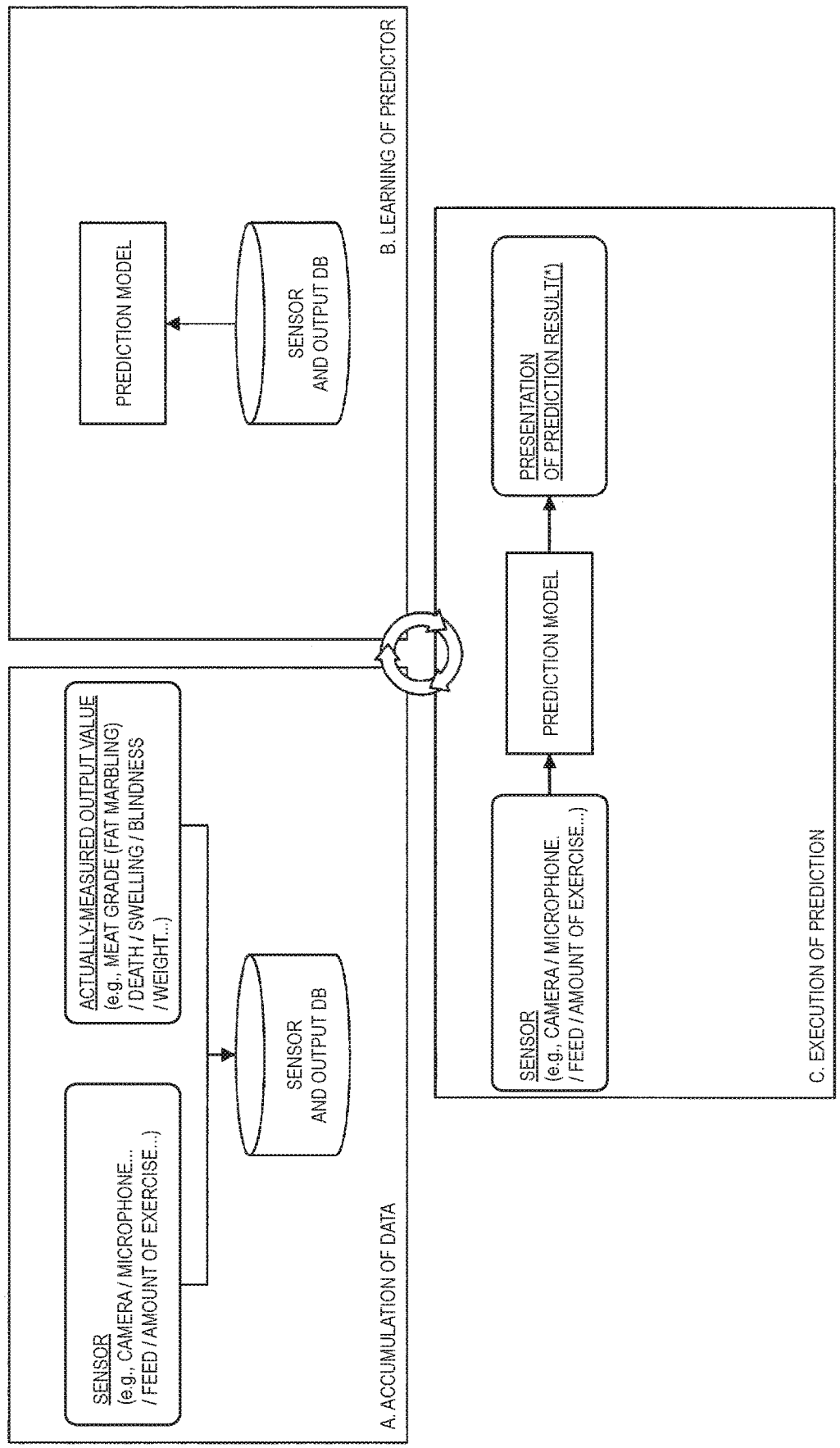
FIG. 11 is a schematic diagram illustrating a cycle in which prediction is executed.

FIG. 11 is a schematic diagram illustrating a cycle in which prediction is performed. First, in a data accumulation cycle (A), information acquired by the sensed information acquisition unit 100 and actually-measured output values are accumulated in the database. The actually-measured output values include information regarding respective cows such as meat grades (fat marbling), death, swelling, blindness, and weights. In a learning cycle of the predictor (B), a prediction model is generated from information accumulated in the database. In a prediction execution cycle (C), the prediction unit 130 executes prediction and the prediction result presentation unit 160 presents a prediction result. Since results are accumulated in the system, the data for which prediction has been executed makes the database rich and improves prediction accuracy.

Figure 4A:
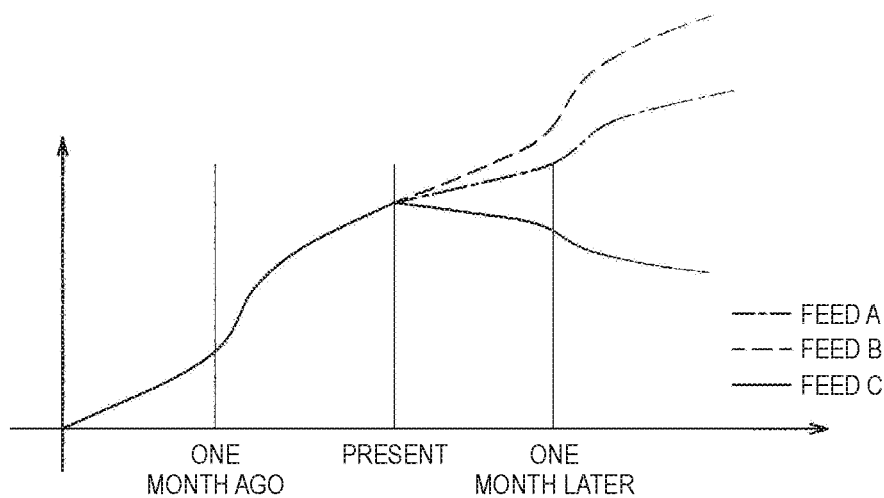
FIG. 4A is a schematic diagram illustrating a presentation example of prediction results obtained by a prediction result presentation unit.
Figure 4B:
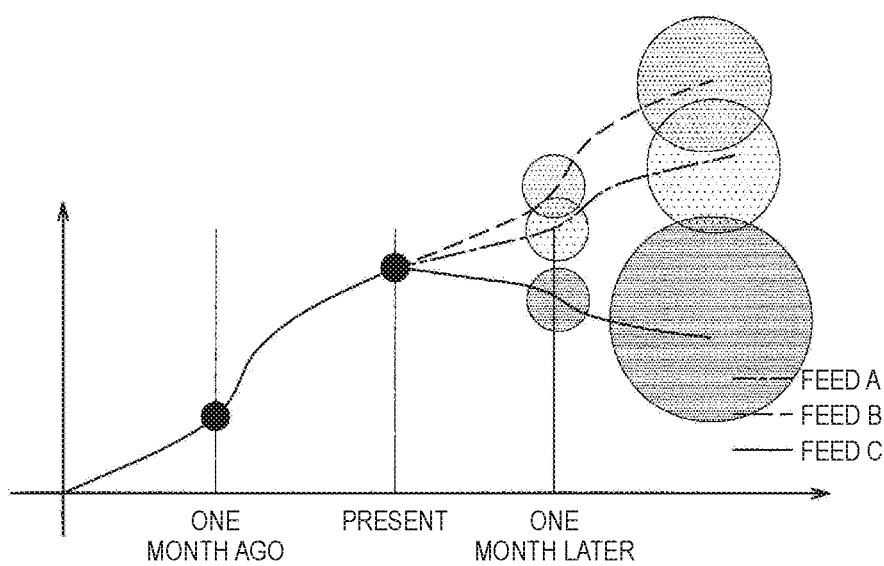
FIG. 4B is a schematic diagram illustrating a presentation example of prediction results obtained by a prediction result presentation unit.
Figure 4C:
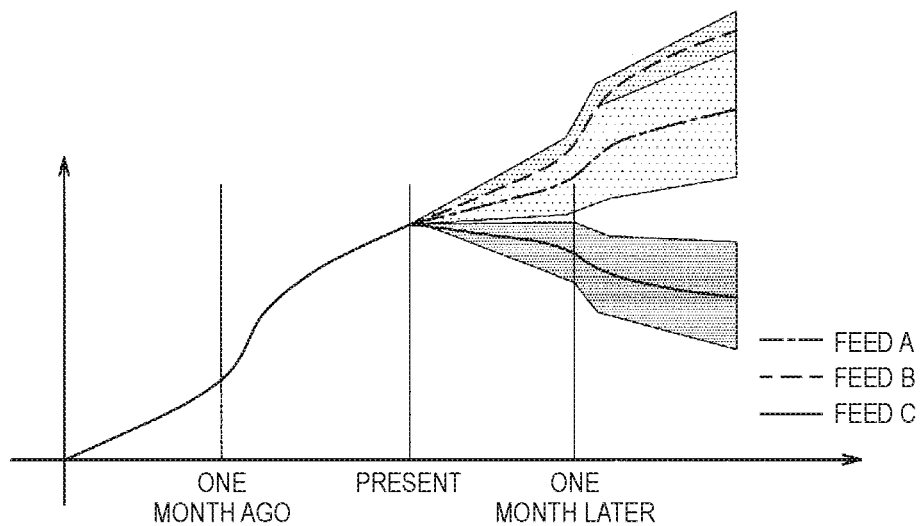
FIG. 4C is a schematic diagram illustrating a presentation example of prediction results obtained by a prediction result presentation unit.

FIGS. 4A, 4B, and to FIG. are schematic diagrams illustrating presentation examples of prediction results obtained by the prediction result presentation unit 160. The examples illustrated in FIGS. 4A, 4B, and 4C show results obtained by predicting future weights of livestock in a case in which three different kinds of feed A, B, and C are given to the livestock all as options. With such past time-series logs, future predictions may be expressed using a graph and the like. As illustrated in FIGS. 4A, 4B, and, uncertainty of prediction increases as the number of days from the present to a future prediction day becomes larger, and thus uncertainty of prediction may be predicted using intuitive expression. For example, FIG. 4A illustrates uncertainty of prediction with concentrations of lines indicating characteristics, and the prediction becomes more uncertain as the concentrations become weaker. In addition, FIG. 4B illustrates degrees of uncertainty of prediction with sizes of circles, similarly to forecast cycles of typhoons, and the circles are displayed to become larger as the number of days from the present to a future prediction day becomes larger. In addition, FIG. 4C illustrates uncertainty of prediction with ranges of the respective characteristics, and the ranges are displayed to become larger as the number of days from the present to a future prediction day becomes larger. Uncertainty of prediction may be shared in predictions. For example, in FIGS. 4A, 4B, and 4C, uncertainty after one month is common in FIGS. 4A, 4B, and 4C. Uncertainty of prediction may be calculated using, for example, time as an element. In addition, an attenuation rate may be changed at each time of prediction. Uncertainty of prediction may be calculated using, for example, a data amount as an element. For example, although the feed A has a high probability due to many times of implementation, the feed C shows uncertainty due to fewer times of implementation.

Prediction illustrated in FIGS. 4A, 4B, and 4C can be performed through learning or the like based on a large scale of data. Progress in weights of livestock, changes in meat quality, and the like are correlated with the fact "the feed has been given this much." On the basis of many evidences of the effect "weight is changed" caused by "the feed has been given this much" and data thereof, a relation between the cause and effect can be ascertained, and thus it is possible to predict "how will the weight be" if "the feed is given this much" now. The prediction model generation unit 110 generates a prediction model on the basis of many evidences of the effect "weight is changed" caused by the fact "the feed has been given this much" and data thereof. As "learning" techniques, for example, linear regression, an SVN, a neural network, and the like can be used. In addition, in a case in which it is not possible to use logs of the same piece of livestock immediately after introduction of a system, in a death example, or the like, prediction can be performed by using logs of a number of other cows. In addition, a generic prediction model can also be used. In addition, if his/her own logs are accumulated, they are used to reduce influence of, for example, "individual differences" or the like, and thus more precise prediction can be performed. In addition, for learning, only his/her own logs may be used or the logs may be used together with a generic model.

If this prediction model is used, a risk and an effect exhibited when a certain behavior is made can be calculated. For example, with respect to a group of cows to which no vitamin A is given among cows under a condition close to that of a target cow, an increased mortality rate and the effect of improved meat quality in comparison to a group to which vitamin A is given are a risk and an effect of the event "no vitamin A is given." In addition, the rate of improvement may be expressed in a form easily understandable by the user. FIG. 5 is a schematic diagram illustrating another presentation example of prediction results obtained by the prediction result presentation unit 160. FIG. 5 illustrates the example of an operation-linked graph representation in which risks (death risks of a cow) and effects (meat quality) are expressed at the same time. In the example illustrated in FIG. 5, the risks and effects exhibited in a case in which vitamin A is given to the cow are shown. The above-described risks and effects may be expressed in the form of, for example, % values, or may be expressed to be standardized with numerical values from 10 to +10 and the like in order to make them easily understandable. As illustrated in FIG. 5, in the case in which vitamin A is not given to the cow, the death risk becomes+10, and the meat quality becomes+10 as well. In a case in which a little vitamin A is given to the cow, the death risk becomes+1, and the meat quality becomes+3. In addition, in a case in which sufficient vitamin A is given to the cow, the death risk becomes 1, and the meat quality becomes-3. In order to present the prediction results illustrated in FIG. 5, the option extraction unit 140 extracts a plurality of parameters (a vitamin A dose, a death risk of the cow, and meat quality) to be predicted by the prediction unit 130. In addition, in addition, the prediction unit 130 predicts combinations of future values of a plurality of parameters (the death risk of the cow and meat quality). In FIG. 5, three types of combinations of future values are shown. When options as illustrated in FIGS. 4A, 4B, and 4C, and FIG. 5 are presented, the user can specify and select any one on the terminal 700. The selection result of the user is transmitted to the information processing device 500 and accumulated in a database 170. Accordingly, a preference of the user can be determined from information accumulated in the database 170. In addition, in a case in which an adjustment device that adjusts a vitamin A dose is connected to the information processing device 500, for example, the selection result of the user is transmitted to the adjustment device. Accordingly, a vitamin A dose can be automatically adjusted by the adjustment device.

In a case in which vitamin A doses vary for each of individual cows, for example, the prediction result presentation unit 160 may present the user with an option (a vitamin A dose) of a cow when the user moves to the front of the cow. In addition, the prediction result presentation unit 160 may present the user with a recommended option (a vitamin A dose) with a cursor pointing at the option. Accordingly, the user can perform operations more easily. Furthermore, in a case in which a trend of a vitamin dose is already known in accordance with a preference of the user, a prediction result may be presented with a cursor pointing at an option in accordance with a tendency of the user. The prediction unit 130 predicts an option that the user is likely to select on the basis of information accumulated in the database 170, the prediction result presentation unit 160 presents the option by matching a cursor on the basis of information regarding the option predicted by the prediction unit 130 that the user is likely to select.

Although the three options illustrated in FIG. 5 are extracted by the option extraction unit 140, there are cases in which presentation of only similar candidates is meaningless, and thus a representative value may be determined through, for example, clustering or the like.

Figure 6:
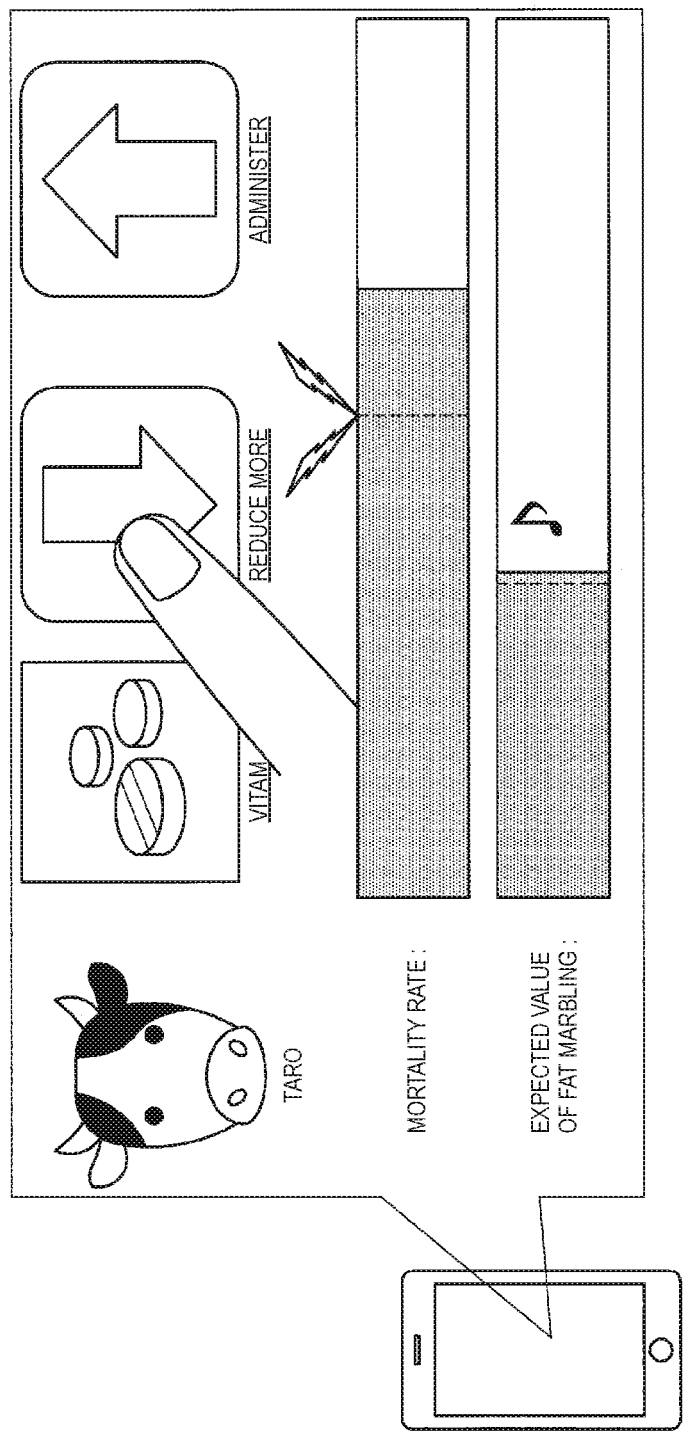
FIG. 6 is a schematic diagram illustrating another presentation example of prediction results by the prediction result presentation unit.

FIG. 6 is a schematic diagram illustrating another presentation example of prediction results obtained by the prediction result presentation unit 160. FIG. 6 illustrates the example of another operation-linked graph representation in which risks and effects are expressed at the same time. In the example illustrated in FIG. 6, the user operates a mobile terminal with a touch panel to reduce a vitamin A dose, and thus if a "reduce more" button is operated, an indicator for the mortality rate and meat quality (an expected rate of fat marbling) changes in accordance with the vitamin A dose. In addition, if an "administer" button is operated to increase the vitamin A dose, the indicator for the mortality rate and meat quality (an expected rate of fat marbling) changes in accordance with the vitamin A dose. Without presenting a plurality of options as illustrated in FIG. 5, prediction values may be rendered (displayed) for a condition adjusted by the user. A dose may be absolutely freely determined by the user, or a preset value may have a form in which the value can be finely adjusted.

In FIG. 6, an increase or a decrease of the graphs may be displayed in an animation in conjunction with an operation of the user. For example, when a dose exceeds a certain or a designated risk level, a warning may be expressed with a changing sound or color. In addition, if a dose exceeds a certain or a designated target value, target achievement may be expressed with a changing sound or color.

Figure 7:
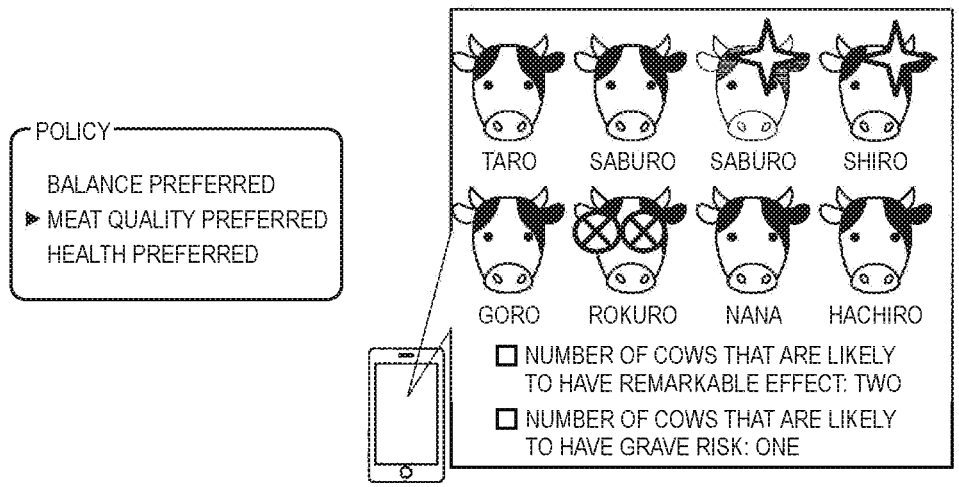
FIG. 7 is a schematic diagram illustrating still another presentation example of a prediction result by the prediction result presentation unit.

FIG. 7 is a schematic diagram illustrating still another presentation example of a prediction result by the prediction result presentation unit 160. Although individual control of prediction values is presented in the examples described so far, individual control may be difficult for large-scale farms. Thus, the user may decide only rough policies and the system may perform automatic control. As a policy input means, for example, rough "policies" may be designated and control may be performed such that risks and effects brought in a case in which the user takes a single action with respect to all cows that the user is breeding are aggregated and an effect to be noted is maximized. The example illustrated in FIG. 7 shows discretionary designation and individual rescue. In the left drawing of FIG. 7, as a rough policies regarding administration of vitamin A, options of "meat quality preferred" for focusing on a meat quality improvement effect even if a mortality rate increases a little, "health preferred" for focusing more on no increase of a mortality rate than on a meat quality improvement effect, and "balance preferred" for focusing on balance between "meat quality preferred" and "health preferred" are presented, and a vitamin A dose is determined in accordance with selection of the user. In a case in which "meat quality preferred" is selected, meat quality is improved although a mortality rate of cows becomes higher to some extent. In the right drawing of FIG. 7, two cows (Saburo and Shiro) that are particularly likely to exhibit a great effect in a case in which "meat quality preferred" is selected are displayed, and one cow (Rokuro) that is likely to have a high risk is displayed. Vitamin A can be administered individually to the cow that is likely to have a high risk. In this manner, a number of cows may be controlled through automatic control on the basis of rough policies, and some specific cows may be controlled individually. In addition, prediction results only of cows that satisfy a predetermined condition may be notified. In a case in which "health preferred" is selected, meat quality may be somewhat low, but the mortality rate of cows drops. In addition, in a case in which "balance preferred" is selected, the goodness of meat quality and a low mortality rate are favorably balanced.

In the example of FIG. 7, hierarchical clustering, for example, Ward's method may be performed, and if the user continuously designates a specific cluster, a hierarchical cluster result one layer deeper may be presented or the like. In addition, determination of whether to cross the layer may be realized using a counter or the like.

Figure 8:
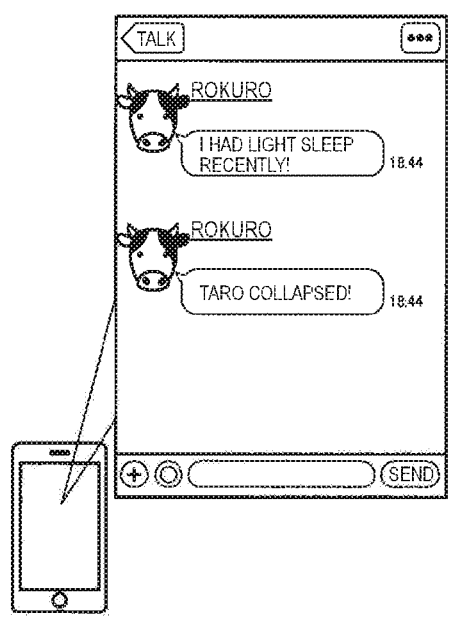
FIG. 8 is a schematic diagram illustrating still another presentation example of a prediction result by the prediction result presentation unit.

FIG. 8 is a schematic diagram illustrating still another presentation example of a prediction result by the prediction result presentation unit 160, illustrating an example in which a presentation timing is autonomously controlled. In the example illustrated in FIG. 8, a cow (Rokuro) saying "I had light sleep recently" is displayed in accordance with a sensing result of a cow (Rokuro). In addition, a cow (Rokuro) saying "Taro collapsed!" is displayed in accordance with a sensing result of a cow (Taro). A timing at which such a report is performed may be actively created by the system. Information without urgency such as a simple report may be sent on time through an existing communication system, for example, an e-mail or an SNS, and can be read by a livestock farmer at free time. In addition, in a case in which "something related to life" of urgency is detected or the like, for example, a notification may be set to reach the user by interruption.

In addition, in a case in which an emergency related to the life of a cow occurs, a veterinarian may be directly informed of the emergency on condition. If a notification is passed through a livestock farmer in a case of a grave emergency, it takes time for checking the situation, which may delay the notification. In such a case, the notification may be set to directly reach a terminal of an attending veterinarian or the like from the information processing device 500. However, since there is concern of a cost such as a veterinary medical expense increasing if detailed information is delivered, it may be set to send a notification to the veterinarian, for example, only for an event of a specific piece of livestock (e.g. a cow that is likely to get the meat grade A5) or under a specific condition (e.g. an urgency rank of A). Furthermore, these setting may be provided as fixed-rate services.

According to the above-described present embodiment, a prediction model is generated on the basis of sensed information acquired by the sensed information acquisition unit 100, and in a case in which prediction is performed on the basis of the prediction model, the prediction result is presented to be visually easily understood at a desired timing of the user. Accordingly, the user can take a proper future measure in accordance with the prediction result.

The preferred embodiment (s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an acquisition unit configured to acquire a plurality of pieces of livestock-farming-related information related to livestock farming;

a prediction unit configured to predict a future value of an arbitrary parameter related to livestock farming on a basis of a prediction model generated on a basis of the livestock-farming-related information; and a prediction result presentation unit configured to present a prediction result obtained by the prediction unit at a predetermined timing related to livestock farming.

(2)

The information processing device according to (1), including:

a feature extraction unit configured to extract a feature amount from the livestock-farming-related information, in which the prediction unit predicts a future value of the parameter on the basis of the prediction model generated on a basis of the feature amount.

(3)

The information processing device according to (1) or (2), including:

a sensing situation evaluation unit configured to evaluate a sensing situation of the livestock-farming-related information; and a sensed information presentation unit configured to present sensed information representing a sensing situation on a basis of the sensing situation.

(4)

The information processing device according to any of (1) to (3), including:

a prediction model generation unit configured to generate the prediction model on the basis of the livestock-farming-related information; and a prediction model accumulation unit configured to accumulate the prediction model.

(5)

The information processing device according to any of (1) to (4), including:

an extraction unit configured to extract one or a plurality of the parameters to be predicted by the prediction unit from a plurality of variables related to livestock farming.

(6)

The information processing device according to (5), in which the prediction unit predicts a future value of the plurality of parameters corresponding to a plurality of tasks related to livestock farming to be executed in the future, and the prediction result presentation unit presents the plurality of tasks and prediction results of the plurality of parameters in association with each other.

(7)

The information processing device according to (5), in which the prediction unit predicts a combination of future values of the plurality of parameters.

(8)

The information processing device according to (7), in which the combination of the plurality of parameters includes a parameter related to a risk and a parameter related to an effect.

(9)

The information processing device according to (7), in which the prediction unit predicts a change of another parameter in a case in which a part of the plurality of parameters is changed.

(10)

The information processing device according to (7), in which the prediction result presentation unit causes values of the plurality of parameters to be displayed as numerical values or indicators.

(11)

The information processing device according to any of (1) to (10), including:

a behavior acquisition unit configured to acquire behavior of a user, in which the prediction result presentation unit presents the prediction result when predetermined behavior of a user is acquired.

(12)

The information processing device according to (11), in which the prediction result presentation unit presents the prediction result at a timing at which the user approaches livestock.

(13)

The information processing device according to (11), including:

a prediction timing control unit configured to control a timing of the presentation of the prediction result by the prediction result presentation unit.

(14)

The information processing device according to any of (1) to (13), in which the prediction result presentation unit changes a presentation state of the prediction result in accordance with a past operation input by a user.

(15)

The information processing device according to (14), in which the prediction result presentation unit presents the prediction result by selecting an option that is presumed to be selected by a user among a plurality of options in a default state in accordance with a past operation input by the user.

(16)

The information processing device according to (14), in which the prediction result presentation unit presents the prediction result such that a cursor is placed on an option that is presumed to be selected by a user among a plurality of options in accordance with a past operation input by the user.

(17)

The information processing device according to any of (1) to (16), in which the prediction result presentation unit changes a presentation state in accordance with uncertainty of a future value of the parameter.

(18)

The information processing device according to any of (1) to (17), in which the prediction unit performs prediction in accordance with a criterion that is consistent for a plurality of pieces of livestock, and the prediction result presentation unit presents a prediction result deviating from the criterion.

(19)

The information processing device according to any of (1) to (18), in which the livestock-farming-related information is sensed information detected by a sensor mounted on a piece of livestock that is a subject of livestock farming.

(20)

The information processing device according to any of (1) to (18), in which the livestock-farming-related information is sensed information obtained by a sensor detecting a living environment of livestock that is a subject of livestock farming.

(21)

An information processing method including:
acquiring a plurality of pieces of livestock-farming-related information related to livestock farming;
predicting a future value of an arbitrary parameter related to livestock farming on a basis of a prediction model generated on a basis of the livestock-farming-related information; and
presenting a result of the prediction at a predetermined timing related to livestock farming.

(22)

A program causing a computer to function as:
a means for acquiring a plurality of pieces of livestock-farming-related information related to livestock farming;
a means for predicting a future value of an arbitrary parameter related to livestock farming on a basis of a prediction model generated on a basis of the livestock-farming-related information; and
a means for presenting a result of the prediction at a predetermined timing related to livestock farming.

REFERENCE SIGNS LIST 100 sensed information acquisition unit
100a sensing situation evaluation unit
100c sensed information presentation unit
110 prediction model generation unit
120 prediction model accumulation unit
125 feature amount extraction unit
128 behavior acquisition unit
130 prediction unit
140 option extraction unit
150 prediction timing control unit
160 prediction result presentation unit
500 information processing device

The invention claimed is:

1. An information processing device, comprising:
an acquisition unit configured to acquire a plurality of pieces of livestock-farming-related information associated with livestock farming;
a feature extraction unit configured to extract at least one feature amount from the livestock-farming-related information;
a prediction model generation unit configured to generate a prediction model based on the extracted at least one feature amount;
a prediction unit configured to predict a value of a first parameter of a plurality of parameters associated with the livestock farming based on the prediction model; and
a prediction result presentation unit configured to present, at a specific timing associated with the livestock farming, a prediction result of the prediction of the value of the first parameter and information associated with a second parameter of the plurality of parameters, wherein
the prediction unit is further configured to predict a change in the value of the first parameter based on a change in a value of the second parameter, and the change in the value of the second parameter is based on a user operation associated with the presented information.

2. The information processing device according to claim 1, further comprising:
a sensing situation evaluation unit configured to evaluate a sensing situation of the livestock-farming-related information; and
a sensed information presentation unit configured to present sensed information representing the sensing situation based on the sensing situation.

3. The information processing device according to claim 1, further comprising a prediction model accumulation unit configured to accumulate the prediction model.

4. The information processing device according to claim 1, further comprising an extraction unit configured to extract the plurality of parameters associated with the livestock farming.

5. The information processing device according to claim 4, wherein
the prediction unit is further configured to predict the value of the first parameter of the plurality of parameters corresponding to a plurality of tasks, associated with the livestock farming, to be executed,
the prediction result presentation unit is further configured to present the plurality of tasks and a plurality of prediction results of the plurality of parameters, and
the plurality of prediction results is associated with the plurality of tasks.

6. The information processing device according to claim 5, wherein the prediction unit is further configured to predict a combination of values of the plurality of parameters.

7. The information processing device according to claim 6, wherein the plurality of parameters includes the first parameter related to a risk and a third parameter related to an effect.

8. The information processing device according to claim 6, wherein the prediction result presentation unit is further configured to display the combination of values of the plurality of parameters as at least one of numerical values or indicators.

9. The information processing device according to claim 1, further comprising a behavior acquisition unit configured to acquire behavior of a user,
wherein the prediction result presentation unit is further configured to present the prediction result in a case where a specific behavior of the user is acquired.

10. The information processing device according to claim 9, wherein the prediction result presentation unit is further configured to present the prediction result at a timing at which the user approaches livestock.

11. The information processing device according to claim 9, further comprising a prediction timing control unit configured to control the specific timing of the presentation of the prediction result by the prediction result presentation unit.

12. The information processing device according to claim 1, wherein the prediction result presentation unit is further configured to change a presentation state of the prediction result based on a past operation input by a user.

13. The information processing device according to claim 12, wherein
the prediction result presentation unit is further configured to present, based on the past operation input by the user, the prediction result in a default state by selection of an option from a plurality of options, and
the option is presumed to be selected by the user.

14. The information processing device according to claim 1, wherein the prediction result presentation unit is further configured to change a presentation state based on uncertainty of the value of the first parameter.

15. The information processing device according to claim 1, wherein
the prediction unit is further configured to predict the value of the first parameter based on a criterion that is consistent for a plurality of pieces of livestock, and
the prediction result presentation unit is further configured to present the prediction result that deviates from the criterion.

16. The information processing device according to claim 1, wherein
the livestock-farming-related information is at least one of sensed information detected by a sensor mounted on a piece of livestock or sensed information obtained by a sensor detecting a living environment of the livestock, and
the livestock is a subject of the livestock farming.

17. An information processing method, comprising:
acquiring a plurality of pieces of livestock-farming-related information associated with livestock farming;
extracting at least one feature amount from the livestock-farming-related information;
generating a prediction model based on the extracted at least one feature amount;
predicting a value of a first parameter of a plurality of parameters associated with the livestock farming based on the prediction model;
presenting, at a specific timing associated with the livestock farming, a result of the prediction of the value of the first parameter and information associated with a second parameter of the plurality of parameters; and
predicting a change in the value of the first parameter based on a change in a value of the second parameter, wherein the change in the value of the second parameter is based on a user operation associated with the presented information.

18. A non-transitory computer-readable medium having stored thereon computer-executable instructions that, when executed by a processor, cause the processor to perform operations, the operations comprising:
acquiring a plurality of pieces of livestock-farming-related information associated with livestock farming;
extracting at least one feature amount from the livestock-farming-related information;
generating a prediction model based on the extracted at least one feature amount;
predicting a value of a first parameter of a plurality of parameters associated with the livestock farming based on the prediction model;
presenting, at a specific timing associated with the livestock farming, a result of the prediction of the value of the first parameter and information associated with a second parameter of the plurality of parameters; and
predicting a change in the value of the first parameter based on a change in a value of the second parameter, wherein the change in the value of the second parameter is based on a user operation associated with the presented information.

* * * * *